J. C. FOX.
LIQUID LEVEL INDICATOR FOR AUTOMOBILE TANKS.
APPLICATION FILED APR. 1, 1920.
1,420,628.
Patented June 27, 1922.
2 SHEETS—SHEET 1.
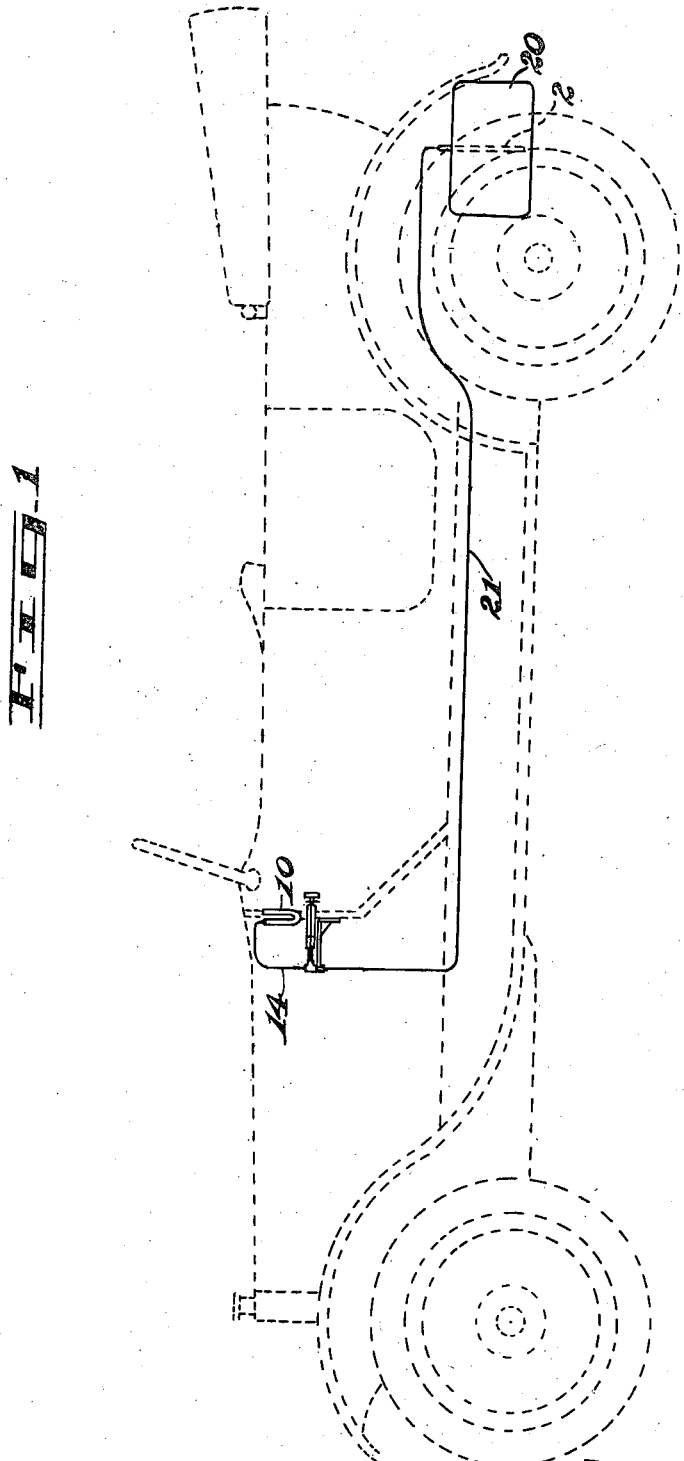
INVENTOR
Joseph Chester Fox.
BY
H. L. & C. L. Reynolds
ATTORNEY J. C. FOX.
LIQUID LEVEL INDICATOR FOR AUTOMOBILE TANKS.
APPLICATION FILED APR. 1, 1920.
1,420,628.
Patented June 27, 1922.
2 SHEETS—SHEET 2.
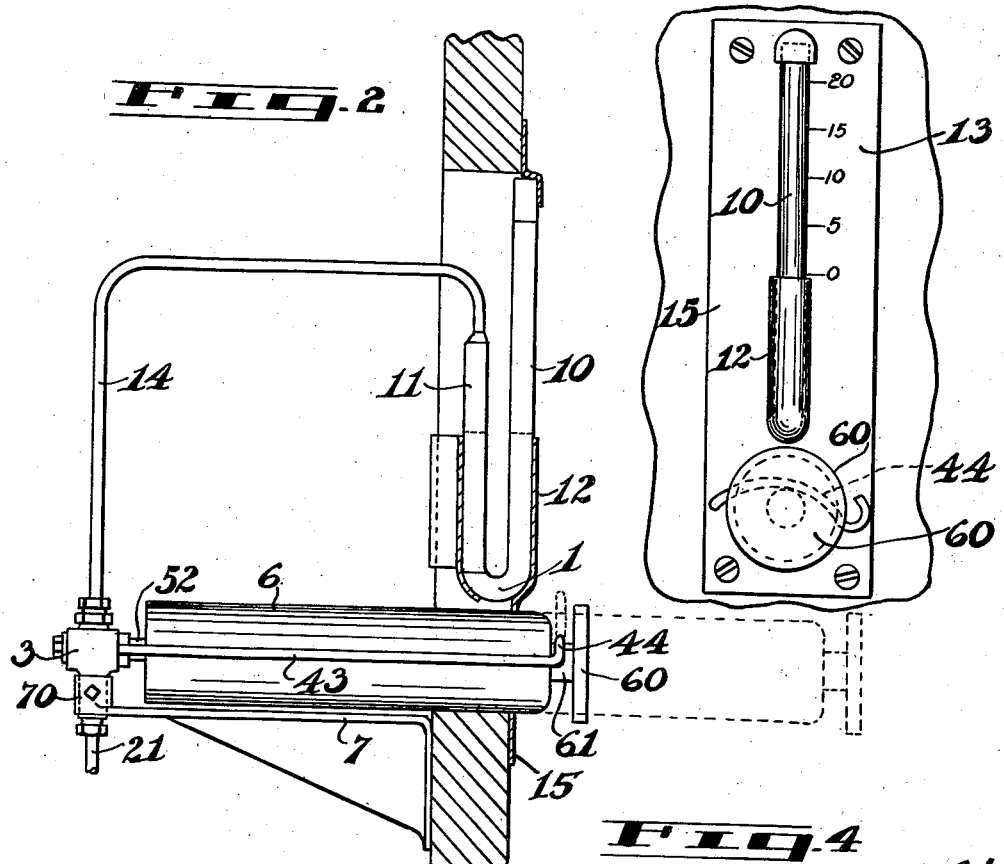
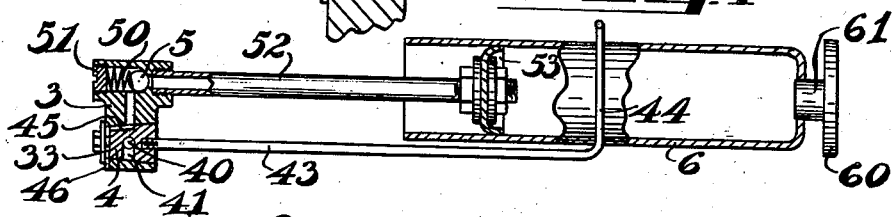
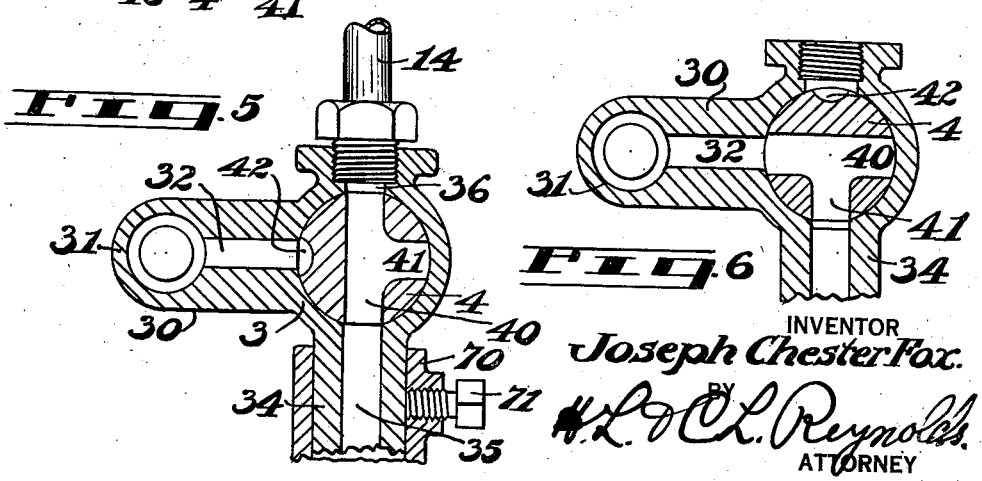
INVENTOR
Joseph Chester Fox.
BY
H. L. & C. L. Reynolds
ATTORNEY

UNITED STATES PATENT OFFICE.

JOSEPH CHESTER FOX, OF SEATTLE, WASHINGTON.

LIQUID-LEVEL INDICATOR FOR AUTOMOBILE TANKS.

1,420,628.  Specification of Letters Patent.  Patented June 27, 1922.

Application filed April 1, 1920. Serial No. 370,379.

*To all whom it may concern:*

Be it known that I, JOSEPH CHESTER FOX, a citizen of the United States of America, and resident of the city of Seattle, in the county of King and State of Washington, have invented certain new and useful Improvements in Liquid-Level Indicators for Automobile Tanks, of which the following is a specification.

My invention relates to devices designed for use in indicating the depth of liquid in a tank at a point distant therefrom and at a level which may be either above or below that of the liquid in the tank.

The object of my invention is to provide a simple and reliable device by which the depth and therefore the amount of liquid in a container may be accurately indicated at a distant point irrespective of the relative levels of the two points, and a device of this kind with which uniform or standard conditions may be conveniently secured, whereby variations of conditions may be secured and accuracy thereby insured.

The construction and manner of operation of a device which has my invention embodied therein, is illustrated in the accompanying drawings and will be hereinafter described. The novel features thereof upon which I desire to obtain a patent, will be defined by the claims.

Figure 1 gives an outline of an automobile and shows the location of my device as installed upon an automobile.

Figure 2 is a side view of the device illustrating its relation to the dash when installed.

Figure 3 is a front elevation of the indicator and supporting plate in position on the dashboard.

Figure 4 is a horizontal section through the valves and the pump, taken on the central or axial plane.

Figures 5 and 6 are cross sections of the controlling valves.

It is recognized as desirable that a driver of an automobile have available, from the driving position, means for determining accurately the amount of gasoline remaining in his tank. My present invention has for its object the provision of such means which shall be accurate, reliable, simple in construction and not subject to getting out of order or to injuriously affect the proper operation of the other parts. I will describe it as applied to an automobile, although it may be applied wherever it may be desired to indicate at a distance from a liquid container the amount of liquid in the container.

The plan which I have adopted for doing this involves the use of a tube, open at its lower end and extending to the bottom of the tank or container as to which it may be desired to be informed of the amount of its contents and a registering tube at the point where the reading is desired, the registering tube being U-shaped or any equivalent construction. The bottom end of this registering tube is connected with the upper end of the tube which extends into the tank by a small tube, into which latter tube is forced air which is compressed by the rise of liquid in the tank tube to thereby produce a proportional rise of the registering liquid in the registering tube.

The tank 20 is shown as located at the rear of the car. The location is, however, immaterial. Into the tank extends a tube 2, which is open at its lower end and extends as near to the bottom of the tank as is feasible. While the natural position of this tube would be vertical, it may be placed in inclined position if for any reason this is necessary or desirable.

It may also be without the tank if connected thereto at or near its bottom.

The registering tube 1 as illustrated is of U-shape, having the indicating leg 10 and the complemental or reservoir leg 11, to which latter is connected a small metal tube 14 which leads to the controlling valve mechanism 3. Alongside of the indicating leg 10 is a scale 13, which may be marked in any desired unit of volume or depth. A protecting plate 15 is provided to which the indicating tube is secured. Preferably this has a projecting rib or trough 12 which properly locates the tube 10.

A small tube 21 connects the upper end of the tank tube 2 with the controlling valve 3. This tube should be small in size and may be conducted between the tank and valve by any convenient route. The formation of depressed pockets or loops in this tube does no particular harm. If made of copper it may be bent as desired.

The controlling valve is shown in detail in Figs. 5 and 6. The function of this valve is, first, to shut off communication between the tank tube 21 and the indicating tube 10; second, to connect the tank tube with an air pump, or other source of supply of air under pressure so that air may be forced into the tube 21 and all the gasoline forced out of the tank tube; third, to vent the side of the indicating tube 2 which is connected with the tank tube, and at the same time disconnect this indicating tube from the pump or other source of supply of air under pressure thereby permitting the liquid in the indicating branch to fall to zero and also to prevent the pump from forcing air into the indicating tube. These functions may be secured by using a plurality of valves, but I prefer to combine all these in a single casing, as has herein been indicated.

The valve 4 is of a three-way plug type, having a through channel 40 and a side channel 41, while the casing 3 has three ports, 32, 35, and 36. The plug however has a special channel or port 42, which is located opposite to the channel 41 and extends lengthwise of the plug to one end thereof and forms a vent channel for the indicating tube when the reading of the device is being corrected.

It is desirable that the smaller end of the valve plug 4, which plug is preferably slightly tapered, stop short of the washer which closes the valve chamber at this end, as shown in Figure 4 thereby forming an annular channel 33 which connects with the atmosphere by a port or notch as 46, formed in the wall of the casing or otherwise, so as to form a free venting channel in cooperation with the channel 42 of the plug.

At one side of the main body of the valve casing is formed a check valve chamber 31. A valve, represented by the ball 5, is held upon its seat by a spring 50 and so as to close by pressure coming from the valve 4 and pump. A plug 51 screwing into the end of this chamber forms an adjustable abutment for the spring, whereby the force with which the check valve is held upon its seat may be adjusted.

An air pump, or other source of air under pressure is connected to deliver air through this check valve to the main or controlling valve 4. The pump may be of varied construction. The pump illustrated has a hollow piston rod 52 and a stationary piston 53, the piston being of the type which has been generally used in bicycle pumps, having a cup-leather which also functions as a valve. The cylinder 6 reciprocates. At its outer end it is provided with a stem 61 and knob 60 which serves as an operating handle.

The controlling valve 4 has a stem 43 which extends alongside of the pump to the outer end thereof where it is bent laterally to form an operating handle 44 which normally lies against the stem 61 and between the end of the pump cylinder and the knob 60. When in this position the controlling valve is positioned as shown in Figure 5, in which the indicating tube is connected with the tank tube. In this position the side arm 44 prevents operation of the pump. In consequence it is impossible to operate the pump until the valve has been turned into the position shown in Figure 6, which is 90° left handed rotation from the position shown in Figures 2 and 3, in which new position the indicating tube 11 is disconnected from the tank tube 21 and also from the pump. The normal locking of the pump through the valve stem, while considered desirable, is not essential, as the pump is vented through the channel 42, when the indicating tube is connected with the tube 21 and the tank tube. There should however be a cut off valve located between the pump connection and the indicating tube and this should be closed whenever the pump is connected with the tube 21. The valve 4 acts as such a cut-off when in the position shown in Figure 6.

Experience has shown that a device of this type will indicate the depth of liquid in the tank with satisfactory accuracy when first operated, but that it loses its accuracy after a time, this being caused largely by greater expansion and contraction of the air contained in the connecting tube 21, under variations of pressure, than occurs in the gasoline.

To compensate for this I have provided means, consisting of the air pump and the valves described, whereby the tube 21 may be filled with air until it blows out of the lower end the tank tube 2 and whereby the indicating tube is also vented, so that it indicates zero. If after this zero condition has been secured in the indicating tube, the tank tube and the indicating tube be connected, the reading secured will be accurate. When therefore the operator of the car desires to get an accurate reading he throws the controlling valve into the position shown in Figure 6, which vents the indicating tube through the port 42, connects the pump discharge 32 with the tank tube 21 and releases the pump. A single stroke of the pump will force enough air into the tube 21 to discharge all the gasoline from the tank tube 2. The controlling valve is then placed in normal position, as shown in Figure 5, which disconnects the pump and connects the indicating tube 10 with the tank tube 2 and produces an accurate indication in the tube 10, irrespective of the temperature at the time and of the variations of temperature which may have previously occurred.

The amount of variation in level produced in the indicating tube is proportional to the size of this tube as compared to that of the tank tube 2. In consequence the variations in level between the two branches of the indicating tube may be much less than that occurring in the tank.

I have found that it adds to the accuracy of the indication if a little time is allowed to elapse after operating the pump before the valve is thrown to normal position, that is, before the indicating member is connected with the tank tube. This is desirable because I have found that a slight escape of air still continues from the lower end of the tank tube after the operation of the pump ceases. The accurate reading of the indicator depends upon obtaining uniform conditions and a delay until escape of air ceases is the most practical and certain way of doing this.

Changes in temperature expand and contract the air in the tubes as does also variations of barometric readings and these, if not compensated for cause incorrect readings. For these reasons uniform conditions should be secured prior to taking a reading and this is secured by expelling all liquid from the tubes leading to the tank and venting the air in the indicating end of the system by connecting it with the outer air to thus secure true atmospheric pressure therein.

While I have described an indicator which consists of a U-shaped tube and believe that for cheapness, reliability and practical service, this type of indicator is best, it is evident that any other type of air pressure operated indicator may be used which is found suitable for the work. I therefore desire it understood that the U-shaped tube when referred to, is intended to also include its mechanical equivalents. Also that the term "air pump" is intended to include any means for delivering air under pressure, such for instance as a tank containing air under pressure.

What I claim as my invention is:

1. In a device of the character described, a pneumatically operated gage, a pipe connecting said gage with the tank to be gaged, a valve interposed in said pipe and adapted to disconnect the gage from the tank and to vent the gage end of the tube, a pump connecting with the tube between said valve and the tank end thereof, a pump lock controlled by the valve to hold the pump inoperative when the gage is connected with the tank, and means acting to normally establish free air connection between the gage and tank and to close the vent for the gage.

2. A gage for tanks comprising an indicating tube and a liquid storing chamber connected at their lower levels, a tube extending downwardly into the tank which is to be gaged and opening thereinto at its lower end, a means for supplying air under pressure to said latter tube, and a valve controlling the said air supply and provided with ports adapted to connect said air supply with the tank tube, a second valve controlling the connection of said air supply with the indicating tube and means controlled by the latter valve to prevent the application of said air under pressure to the tank tube except when the latter valve is in position to disconnect the indicating tube from the air supply.

3. In a device for indicating the depth of liquid in a distant tank, an open ended tube insertable to the bottom of the tank, a U-shaped indicating tube, a pipe connecting the indicating tube with the tank tube, an air pump and a three-way valve in said pipe in the plug of which valve has a venting channel upon its fourth side, the pipe connecting the indicating tube and the tank tube being connected at opposite sides of the valve casing, a pump connected with said valve intermediate said points, a valve in the pipe connecting the first named valve with the indicating tube, the stem of the said second valve carrying means for locking the pump when the second valve is open.

4. In a device of the character described an air pump and a valve operating means adapted to lock the pump against operation when the valve is in normal position.

5. In a device of the character described, an air pump, a controlling valve having a stem provided with an operating arm which is positioned to prevent the reciprocation of the movable member of the pump when the valve is in normal position.

Signed at Seattle, King county, Washington, this 26th day of March, 1920.

JOSEPH CHESTER FOX.